United States Patent
Kraemer et al.

(10) Patent No.: US 9,056,274 B2
(45) Date of Patent: Jun. 16, 2015

(54) SYSTEM AND METHOD FOR CONTROLLING AND REDUCING $NO_x$ EMISSIONS

(75) Inventors: Gilbert Otto Kraemer, Greer, SC (US); Harish Radhakrishna Acharya, Clifton Park, NY (US); Robert Thomas Thatcher, Greer, SC (US)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 13/279,186

(22) Filed: Oct. 21, 2011

(65) Prior Publication Data

US 2013/0098049 A1    Apr. 25, 2013

(51) Int. Cl.
*B01D 53/56* (2006.01)

(52) U.S. Cl.
CPC ..................... *B01D 53/56* (2013.01)

(58) Field of Classification Search
CPC ....................................... B01D 53/56
USPC .......... 423/235, 212; 422/168, 169, 171, 172, 422/182, 111
See application file for complete search history.

(56) References Cited

U.S. PATENT DOCUMENTS

| 4,075,376 | A | * | 2/1978 | Jaeger | 165/133 |
|---|---|---|---|---|---|
| 4,350,669 | A | | 9/1982 | Izumi et al. | |
| 4,566,267 | A | * | 1/1986 | Muller et al. | 60/784 |
| 4,971,777 | A | | 11/1990 | Firnhaber et al. | |
| 5,047,220 | A | * | 9/1991 | Polcer | 423/235 |
| 6,168,709 | B1 | | 1/2001 | Etter | |
| 6,521,196 | B2 | | 2/2003 | Campbell et al. | |
| 7,291,576 | B2 | | 11/2007 | McCabe et al. | |
| 7,776,297 | B2 | | 8/2010 | Cichanowicz | |
| 7,914,747 | B1 | * | 3/2011 | Kraemer | 422/170 |
| 2002/0179493 | A1 | | 12/2002 | Etter | |

(Continued)

FOREIGN PATENT DOCUMENTS

| EP | 1374978 A1 | 1/2004 |
|---|---|---|
| EP | 1251936 B1 | 3/2005 |

(Continued)

OTHER PUBLICATIONS

Search Report and Written Opinion from EP Application No. 12188891.1 dated Mar. 6, 2013.

(Continued)

*Primary Examiner* — Jill Warden
*Assistant Examiner* — Joye L Woodard
(74) *Attorney, Agent, or Firm* — Fletcher Yoder P.C.

(57) ABSTRACT

A system includes a gas production source configured to produce a gas stream comprising nitrogen oxides ($NO_x$) and a hydrocarbon injector disposed downstream of the gas production source and configured to inject a hydrocarbon into the gas stream. The hydrocarbon is configured to oxidize molecules of the $NO_x$ in the gas stream to produce a higher order compound of nitrogen and oxygen ($N_yO_z$). The system also includes a removal device disposed downstream of the hydrocarbon injector. The removal device is configured to remove the $N_yO_z$ from the gas stream via absorption or reaction.

25 Claims, 6 Drawing Sheets

(56) References Cited

U.S. PATENT DOCUMENTS

| | | |
|---|---|---|
| 2005/0145827 A1 | 7/2005 | McCabe et al. |
| 2005/0232838 A1 | 10/2005 | Cichanowicz |
| 2006/0032788 A1 | 2/2006 | Etter |
| 2006/0233688 A1 | 10/2006 | Barckholtz et al. |

FOREIGN PATENT DOCUMENTS

| | | |
|---|---|---|
| EP | 1634638 A2 | 3/2006 |
| EP | 1645325 A2 | 4/2006 |
| EP | 1374978 B1 | 5/2008 |
| GB | 1488087 A | 10/1977 |
| GB | 1547531 A | 6/1979 |
| WO | WO 0010914 A1 | 3/2000 |
| WO | WO 0151178 A1 | 7/2001 |
| WO | WO 0222239 A1 | 3/2002 |
| WO | WO2006025900 A2 | 3/2006 |

OTHER PUBLICATIONS

U.S. Appl. No. 12/766,584, filed Apr. 23, 2010, Kraemer, Gilbert Otto.

U.S. Appl. No. 12/915,241, filed Oct. 29, 2010, Kraemer, Gilbert Otto.

* cited by examiner

SYSTEM AND METHOD FOR CONTROLLING AND REDUCING $NO_x$ EMISSIONS

BACKGROUND OF THE INVENTION

The subject matter disclosed herein relates to reducing emissions of nitrogen oxides ($NO_x$), and more particularly, to systems and methods for reducing $NO_x$ emissions from $NO_x$ producing sources.

$NO_x$ emissions are a concern for many industries, particularly in power-generating industries. $NO_x$ production may occur in high-temperature combustion applications and/or with the combustion of nitrogen-bearing fuels. At high combustion temperatures, diatomic nitrogen in the combustion air may be oxidized to produce $NO_x$. Nitrogen in the fuel may also be released as free radicals during combustion to form $NO_x$. One approach to $NO_x$ reduction involves the injection of a reducing agent over a catalyst to convert $NO_x$ to $N_2$. For example, ammonia may be used with a selective catalytic reduction (SCR) catalyst to reduce $NO_x$ emissions. However, such methods may generate particulates that foul downstream equipment, thereby increasing maintenance and cleanup costs.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas production source configured to produce a gas stream comprising nitrogen oxides ($NO_x$) and a hydrocarbon injector disposed downstream of the gas production source and configured to inject a hydrocarbon into the gas stream. The hydrocarbon is configured to oxidize molecules of the $NO_x$ in the gas stream to produce a higher order compound of nitrogen and oxygen ($N_yO_z$). The system also includes a removal device disposed downstream of the hydrocarbon injector. The removal device is configured to remove the $N_yO_z$ from the gas stream via absorption or reaction.

In a second embodiment, a system includes a hydrocarbon supply system configured to supply a hydrocarbon into a gas stream. The hydrocarbon is configured to oxidize nitrogen oxides ($NO_x$) in the gas stream to produce a higher order compound of nitrogen and oxygen ($N_yO_z$). The system also includes a removal device disposed downstream of the hydrocarbon supply system. The removal device is configured to remove the $N_yO_z$ from the gas stream via absorption or reaction. The system also includes a controller configured to adjust the hydrocarbon injector and/or the removal device in response to sensor feedback to reduce a $NO_x$ level below a threshold $NO_x$ level in the gas stream downstream of the removal device.

In a third embodiment, a method includes oxidizing nitrogen oxides ($NO_x$) in a gas stream by contacting the gas stream with a hydrocarbon to produce a higher order compound of nitrogen and oxygen ($N_yO_z$) and removing the $N_yO_z$ from the gas stream via absorption or reaction downstream from the oxidizing.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for $NO_x$ abatement. For example, a system may include a gas production source that produces a gas stream that includes $NO_x$. The system may also include a hydrocarbon injector disposed downstream of the gas production source that injects a hydrocarbon into the gas stream. The hydrocarbon injected by the hydrocarbon injector oxidizes molecules of the $NO_x$ in the gas stream to produce higher order compounds of nitrogen and oxygen ($N_yO_z$). Such higher order compounds of nitrogen and oxygen ($N_yO_z$) may be easier to remove from the gas stream than $NO_x$. For example, $N_yO_z$ may be more soluble in water than $NO_x$. Thus, the system may include a water-based removal device disposed downstream of the hydrocarbon injector to help remove the $N_yO_z$ from the gas stream. Thus, by converting $NO_x$ into compounds that are easier to remove from the gas stream, the hydrocarbon injector helps to remove $NO_x$ from the gas stream.

In certain embodiments, the system may include a sensor that senses a level of $NO_x$ in the gas stream downstream of the hydrocarbon injector or removal device. The sensor may provide feedback to a controller that sends a signal to adjust the hydrocarbon injector and/or the removal device to reduce the $NO_x$ level in the gas stream below a threshold level of $NO_x$. For example, if the sensed $NO_x$ level is above the threshold $NO_x$ level, the controller may send a signal to adjust the hydrocarbon injector to inject more of the hydrocarbon into the gas stream. Similarly, if the sensed $NO_x$ level is below the threshold $NO_x$ level, the controller may send a signal to adjust the hydrocarbon injector to inject less of the hydrocarbon into the gas stream to help reduce hydrocarbon consumption. In addition, the controller may include engine and/or combustor models that provide feed forward signals to adjust the flow rate of the injected hydrocarbon or other reactant based on a prediction for the emissions output of the combustion system.

Using hydrocarbon injection for $NO_x$ abatement may offer several advantages compared to other methods of $NO_x$ abatement. For example, fewer particulates may be generated when using hydrocarbons for $NO_x$ abatement compared to other methods of $NO_x$ abatement. Particulates produced by other methods of $NO_x$ abatement may adhere to equipment disposed downstream of the gas production source and may be difficult and costly to remove. In addition, the hydrocarbon injected by embodiments of the hydrocarbon injector may already be used elsewhere in the plant or facility that includes the system. For example, the hydrocarbon may be combusted in a burner used to control temperatures elsewhere within the system. Thus, the additional cost and complexity associated with introducing a new chemical to the plant may be avoided.

Figure 1:
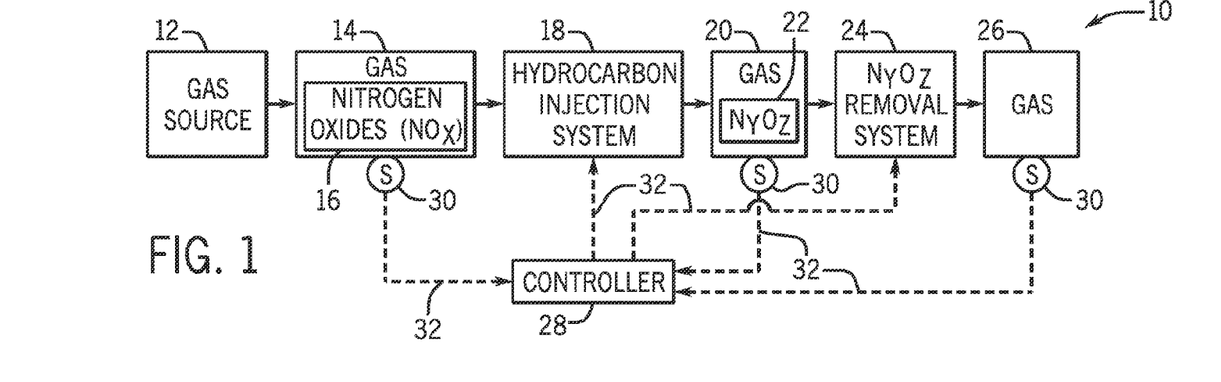
FIG. 1 is a block diagram of an embodiment of a system for reducing $NO_x$ emissions.

FIG. 1 is a block diagram of an embodiment of a $NO_x$ abatement system 10. As shown in FIG. 1, the $NO_x$ abatement system 10 includes a gas source 12, such as, but not limited to, a combustor, reactor, gas turbine, boiler, furnace, reciprocating engine, gas turbine engine, a refinery processing plant, a chemical processing plant, and so forth. The gas source 12 produces a gas 14 that includes $NO_x$ 16. In certain embodiments, the gas 14 may be produced by the combustion of a fuel. In general, the $NO_x$ abatement system 10 may be employed in any application in which a gas 14 that includes $NO_x$ 16 is produced. The gas 14 may include various compositions of $NO_x$ 16. For example, the $NO_x$ 16 may include NO and $NO_2$, and a ratio of the NO to $NO_2$ may be between approximately 2:1 to 50:1, 4:1 to 25:1, or 8:1 to 10:1. Next, the gas 14 may enter a hydrocarbon injection system 18, which brings the gas 14 in contact with a hydrocarbon. Various methods for bringing the gas 14 into contact with the hydrocarbon in the hydrocarbon injection system 18 are discussed in detail below. Examples of the hydrocarbon used in the hydrocarbon injection system 18 include, but are not limited to, heavy fuel oil, Number 6 fuel oil, crude oil, kerosene, diesel, ultra-low-sulfur diesel, gasoline, ethanol, propylene, propane, and similar hydrocarbons. In certain embodiments, the hydrocarbon may include other suitable non-hydrocarbon reducing agents, such as, but not limited to, hydrogen. The hydrocarbon may also be a combination or mixture of any of the materials listed above. Such mixtures may include the materials in a variety of different ratios. In the hydrocarbon injection system 18, the hydrocarbon oxidizes the $NO_x$ 16 to yield higher order $N_yO_z$ molecules, e.g., $NO_2$ and/or $N_2O_5$. The term higher order $N_yO_z$ molecules as used herein refers to $N_yO_z$ molecules in which the value of y and/or z is greater than 1. These molecules may be the product of the oxidation of NO. For example, the higher order $N_yO_z$ molecules include $NO_2$ and $N_2O_5$. The term also includes other nitrogen oxides that are of a higher order than NO, including $N_2O$, $N_2O_3$, and $N_2O_4$. A variety of mechanisms may exist to explain how the hydrocarbon oxidizes the $NO_x$ 16. For example, one possible explanation may be that radicals, such as OH, react with the hydrocarbon in a series of reactions to eventually produce carbon monoxide and $HO_2$, which then reacts with the $NO_x$ 16 to form $N_yO_z$ and additional OH. In certain embodiments, the hydrocarbon injection system may oxidize between approximately 40 to 90, 50 to 80, or 60 to 70 percent of the $NO_x$ 16 to produce $N_yO_z$. Thus, the hydrocarbon injection system 18 produces a treated gas 20 that includes $N_yO_z$ 22, but less $NO_x$ 16 than the gas 14. For example, a ratio of the $N_yO_z$ 22 to $NO_x$ 16 in the treated gas 20 may be between approximately 1:4 to 20:1, 2.5:1 to 10:1, or 3:1 to 5:1.

The treated gas 20 may then pass through a $N_yO_z$ removal system 24 where the $N_yO_z$ is removed from the treated gas 20. For example, the treated gas 20 may be scrubbed in a solvent, such as an aqueous solvent, and the $N_yO_z$ 22 may be absorbed or reacted and then removed from the treated gas 20. In other words, the $N_yO_z$ 22 in the treated gas 20 may be removed downstream of the hydrocarbon injection system 18 by solvent absorption (such as by aqueous absorption) or reaction. The molecules of $N_yO_z$ 22, particularly $NO_2$ and $N_2O_5$ molecules, are soluble in water, and may be removed from the treated gas 20 by applying water to the treated gas 20. For example, water may be sprayed into the treated gas 20 in the $N_yO_z$ removal system 24 by a water injecting device, e.g., through one or more spray nozzles, to absorb the molecules of the $N_yO_z$ 22 in the treated gas 20. The water and $N_yO_z$ 22 molecules may be thereafter separated from the treated gas 20. In certain embodiments, the $N_yO_z$ removal system 24 may include a water-collecting device configured to condense water vapor in the treated gas 20. The condensed water may absorb the $N_yO_z$ 22 in the treated gas 20 and the water and $N_yO_z$ 22 may be thereafter separated from the treated gas 20. In another embodiment, an aqueous or other solvent film may flow onto a high surface area structure, such as a demister pad, where the film absorbs the $N_yO_z$ 22. In other embodiments, the $N_yO_z$ 22 molecules may be separated by reaction of the $N_yO_z$ 22 molecules with a reactant. For example, $N_yO_z$ 22 molecules may contact and react with soda lime in the $N_yO_z$ removal system 24, such as in a lime based water solution. After removal of the $N_yO_z$ 22 by the $N_yO_z$ removal system 24, an exhaust gas 26 may be essentially free of $N_yO_z$ 22. For example, the amount of $N_yO_z$ 22 in the exhaust gas 26 may be between approximately 1 to 10, 1.5 to 5, or 2 to 3 ppm. Accordingly, the amount of $NO_x$ 16 in the exhaust gas 26 may be between approximately 0.2 to 2, 0.3 to 1, or 0.4 to 0.6 ppm. Such concentrations of $NO_x$ and/or $N_yO_z$ may be less than any applicable environmental regulations and thus, the exhaust gas 26 may be released to the atmosphere.

In the illustrated embodiment, the $NO_x$ abatement system 10 includes a controller 28. The controller 28 may be coupled to one or more sensors 30 configured and positioned to measure one or more characteristics of the $NO_x$ abatement system 10. For example, the sensors 30 may measure at least one of a concentration of $NO_x$, a concentration of NO, or a concentration of $NO_2$. In some embodiments, the sensor 30 may be positioned upstream of the hydrocarbon injection system 18 to measure the $NO_x$ concentration of the gas 14. In certain embodiments, the sensor may be positioned downstream of the hydrocarbon injection system 18 to measure the $NO_x$ concentration of the treated gas 20. In certain embodiments, the sensor may be positioned downstream of the $N_yO_z$ removal system 24 to measure the $NO_x$ concentration of the exhaust gas 26. The sensors 30 may transmit signals 32 indicative of the measured characteristic, such as the $NO_x$ concentration, to the controller 28.

The controller 28 may execute an algorithm to determine an amount of hydrocarbon to be added to the gas 14 in the hydrocarbon injection system 18 depending on the signals 32 transmitted from the sensors 30. For example, the controller 28 may send a signal 32 to the hydrocarbon injection system 18 to adjust the amount of hydrocarbon injected into the gas 14. As such, the controller 28 may determine the amount of hydrocarbon to be added based on the measured characteristic. For example, if the sensor 30 measures the $NO_x$ concentration upstream of the hydrocarbon injection system 18, the controller 28 may employ a model-based algorithm to determine the amount of hydrocarbon to add to the gas 14 to achieve the desired $NO_x$ reduction. If the sensor 32 measures the $NO_x$ concentration downstream of the hydrocarbon injection system 18, the controller 28 may employ a closed-loop feedback control algorithm to adjust the amount of hydrocarbon added until the desired $NO_x$ concentration, e.g., a pre-designated control set point, is achieved. In other embodiments, the controller 28 may also send signals 32 to the $N_yO_z$ removal system 24 in response to the signals 32 transmitted from the sensors 30. For example, the controller 28 may direct the $N_yO_z$ removal system 24 to increase a water flow rate in response to increased $N_yO_z$ 22 sensed in the exhaust gas 26. Similarly, the controller 28 may direct the $N_yO_z$ removal system 24 to decrease a water flow rate in response to decreased $N_yO_z$ 22 sensed in the exhaust gas 26 to reduce water consumption.

In some embodiments, the controller 28 may receive data from multiple sensors 30 and determine the amount of hydrocarbon to be added in the hydrocarbon injection system 18 based upon a multi-variable algorithm. For example, the controller 28 may receive signals 32 from one or more sensors 30 indicating multiple gas stream characteristics, including, but not limited to, the concentration of $NO_x$, the concentration of NO, the concentration of $NO_2$, or a gas stream temperature. The sensors 30 may also be placed at one or more locations along the gas stream flow path of the $NO_x$ abatement system 10. Based on the signals 32 transmitted by the one or more sensors 30, the controller 28 may generate control signals 32 indicative of the amount of the hydrocarbon to be added in the hydrocarbon injection system 18. The signals 32 from the controller 28 may be received by an actuator disposed in the hydrocarbon injection system 18. The actuator may be configured to regulate the amount of the hydrocarbon that is injected into the gas 14 in response to the signals 32 generated by the controller 28. For example, the actuator may include a control valve or other device suitable for controlling the amount of hydrocarbon that is added to the gas 14.

Figure 2:
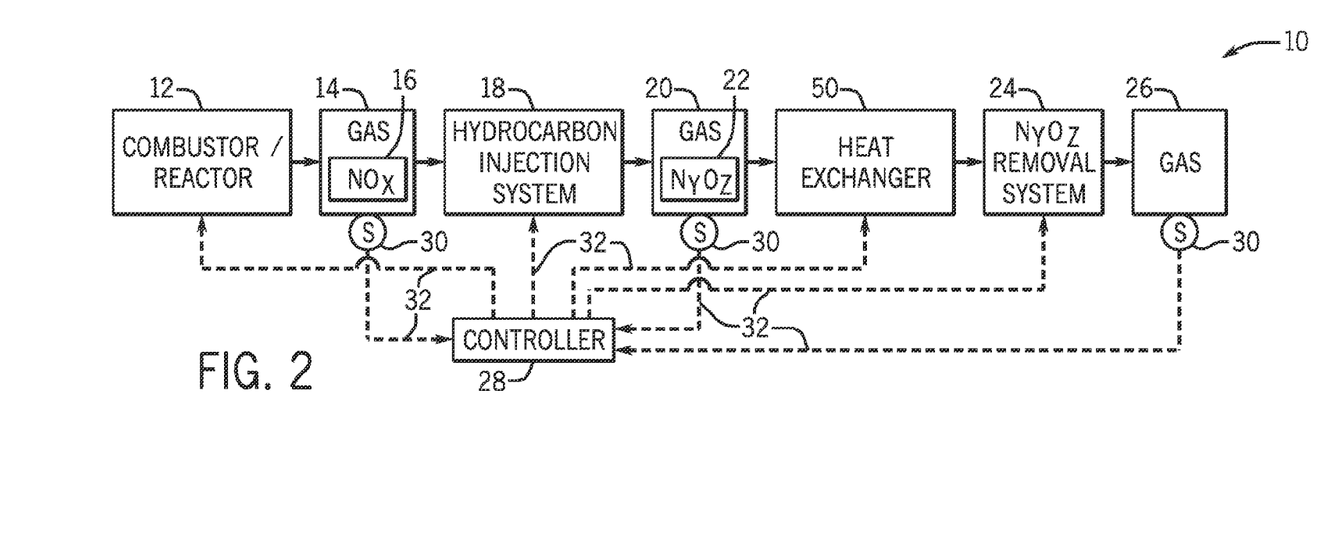
FIG. 2 is a block diagram of an embodiment of a system for reducing $NO_x$ emissions generated by a combustor or reactor.

FIG. 2 is a block diagram of an embodiment of the $NO_x$ abatement system 10. Elements in FIG. 2 in common with those shown in FIG. 1 are labeled with the same reference numerals. In the illustrated embodiment, the $NO_x$ abatement system 10 includes a combustor or reactor 12, which generates the gas 14. For example, the combustor 12 may be disposed in a gas turbine engine of an integrated gasification combined cycle (IGCC) or combined cycle gas turbine (CCGT) system. In certain embodiments, compressed air from a compressor enters the combustor 12, where the compressed air may mix and combust with fuel within the combustor 12 to drive a turbine. In other embodiments, the reactor 12 may be part of a hydrocarbon refining facility. In further embodiments, the combustor or reactor 12 may be disposed in other facilities, such as, but not limited to, power generation facilities, chemical facilities, hydrocarbon facilities, steam facilities, gas facilities, and so forth.

In the illustrated embodiment of FIG. 2, a heat exchanger 50 may be disposed between the hydrocarbon injection system 18 and the $N_yO_z$ removal system 24. The heat exchanger 50 may be used to remove heat from the treated gas 20 to be used elsewhere in the facility that includes the $NO_x$ abatement system 10. For example, a temperature of the treated gas 20 may between approximately 260 to 700, 370 to 650, or 480 to 590 degrees Celsius. The heat from the treated gas 20 may be transferred to a heat transfer fluid, such as water, which may then be used elsewhere in the facility to transfer heat to a colder material. Thus, the temperature of the gas entering the $N_yO_z$ removal system 24 may be less than that of the treated gas 20 entering the heat exchanger 50. In certain embodiments, the efficiency and/or effectiveness of the $N_yO_z$ removal system 24 may be higher at lower temperatures. Thus, the heat exchanger 50 may be used to improve the overall efficiency of the $NO_x$ abatement system 10. In certain embodiments, the controller 28 may direct the heat exchanger 50 to remove additional heat from the gas 20 in response to increased temperatures sensed downstream of the heat exchanger 50. For example, the controller 28 may direct an increased flow rate of the heat transfer fluid through the heat exchanger 50. Similarly, the controller 28 may direct the heat exchanger 50 to decrease the flow of heat transfer fluid through the heat exchanger 50 in response to decreased temperatures sensed downstream of the heat exchanger 50. In other respects, the $NO_x$ abatement system 10 shown in FIG. 2 is similar to the system 10 shown in FIG. 1.

Figure 3:
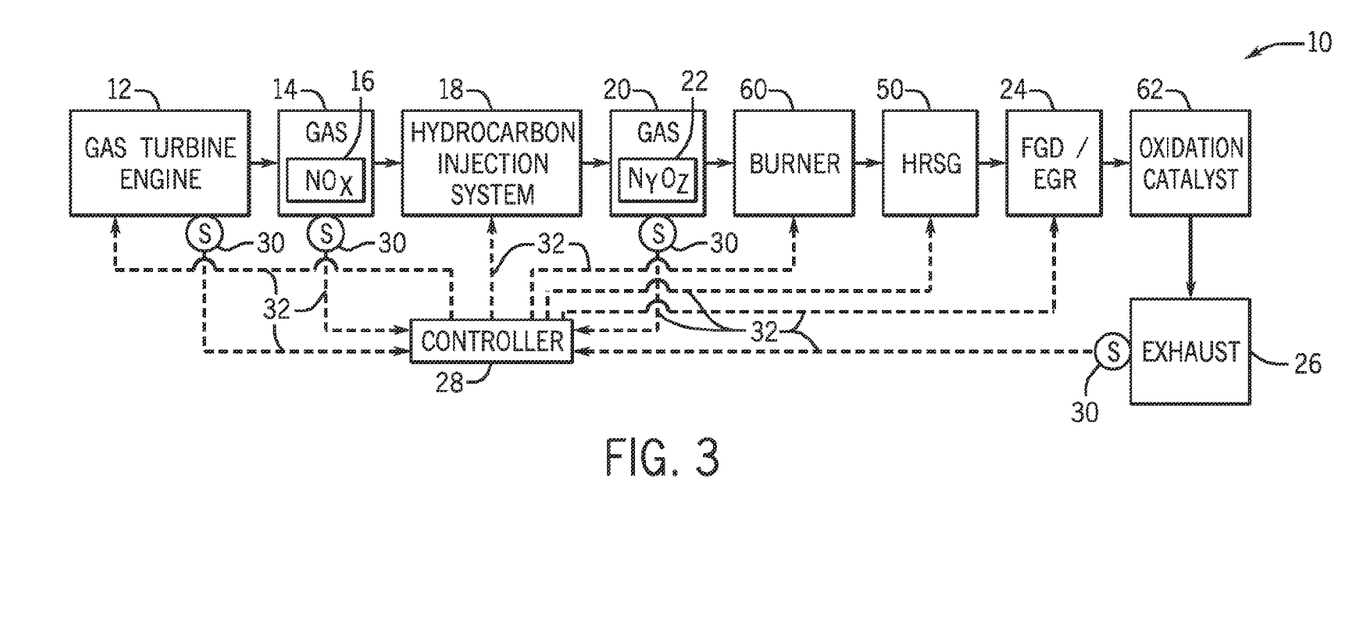
FIG. 3 is a block diagram of an embodiment of a system for reducing $NO_x$ emissions generated by a gas turbine engine.

FIG. 3 is a block diagram of an embodiment of the $NO_x$ abatement system 10. Elements in FIG. 3 in common with those shown in FIG. 1 are labeled with the same reference numerals. As shown in FIG. 3, the $NO_x$ abatement system 10 includes a gas turbine engine 12, which generates the gas 14. The gas turbine engine 12 may combust a fuel, such as syngas, to produce hot pressurized exhaust gases that may be used to drive a turbine. In addition, the $NO_x$ abatement system 10 may include a flue gas desulfurization (FGD) or exhaust gas recirculation system (EGR) 24. FGD may refer to the removal of sulfur dioxide ($SO_2$) from the exhaust flue gases of fossil fuel power plants and chemical producers of sulfur oxides. For example, if the gas turbine engine 12 combusts a fuel with a high sulfur content, aqueous absorption and/or reaction of $N_yO_z$ 22 molecules may be performed as part of the FGD process within the FGD system 24. Various types of scrubbers may be employed to separate the $N_yO_z$ 22 molecules from the gas 20 in the FGD system 24 including, but not limited to, spray towers, packed bed scrubbers, and/or venturi scrubbers. EGR may refer to the recirculation of a portion of the exhaust gas 26 back to the gas turbine engine 12. The EGR system 24 may include a water condensation unit to remove a portion of the $N_yO_z$ 22 circulated back to the gas turbine engine 12. In certain embodiments, the controller 28 may direct the FGD or EGR 24 to remove additional $N_yO_z$ 22 from the gas 20 in response to higher $N_yO_z$ 22 concentrations sensed downstream of the FGD or EGR 24. Similarly, the controller 28 may direct the FGD or EGR 24 to decrease the flow of water or other solvent in response to lower $N_yO_z$ 22 concentrations sensed downstream of the FGD or EGR 24.

Further, the $NO_x$ abatement system 10 may include a heat recovery steam generator (HRSG). Heated exhaust gas from the gas turbine engine 12 may be transported to the HRSG 50 and used to heat water to produce steam used to power other equipment, such as a steam turbine engine. In addition, the gas production system 10 may include a burner 60 disposed between the hydrocarbon injection system 18 and the HRSG 50. The burner 60 may include a flame in which materials, such as a hydrocarbon fuel, react with oxygen to produce carbon dioxide and water in a combustion reaction. In certain embodiments, the treated gas 20 may include certain byproducts such as, but not limited to, carbon monoxide generated in the hydrocarbon injection system 18 and/or excess hydrocarbons from the system 18. Although emissions of such materials may not be regulated, it may be desirable to remove the materials from the treated gas 20. Thus, the burner 60 may be used to combust these materials in the treated gas 20 to produce carbon dioxide and water. In certain embodiments, the HRSG 50 may include the burner 60, referred to as a duct burner, to control the internal temperatures of the HRSG 50. Thus, additional costs and complexity associated with installing a separate burner 60 to remove carbon monoxide or hydrocarbons from the gas 20 may be avoided when the HRSG 50 already includes a duct burner.

In certain embodiments, the $NO_x$ abatement system 10 may include an oxidation catalyst 62 disposed downstream of the FGD or EGR 24. The oxidation catalyst 62 may be used in a manner similar to the burner 60 to reduce the amount of carbon monoxide and/or excess hydrocarbons from the hydrocarbon injection system 18. Although emissions of such materials may not be regulated, it may be desirable to remove the materials before sending the exhaust gas 26 to the atmosphere. Thus, the oxidation catalyst 62 may be used to oxidize these materials to produce carbon dioxide and water. In certain embodiments, the oxidation catalyst 62 may be used if the burner 60 is omitted or to supplement the performance of the burner 62.

Figure 4:
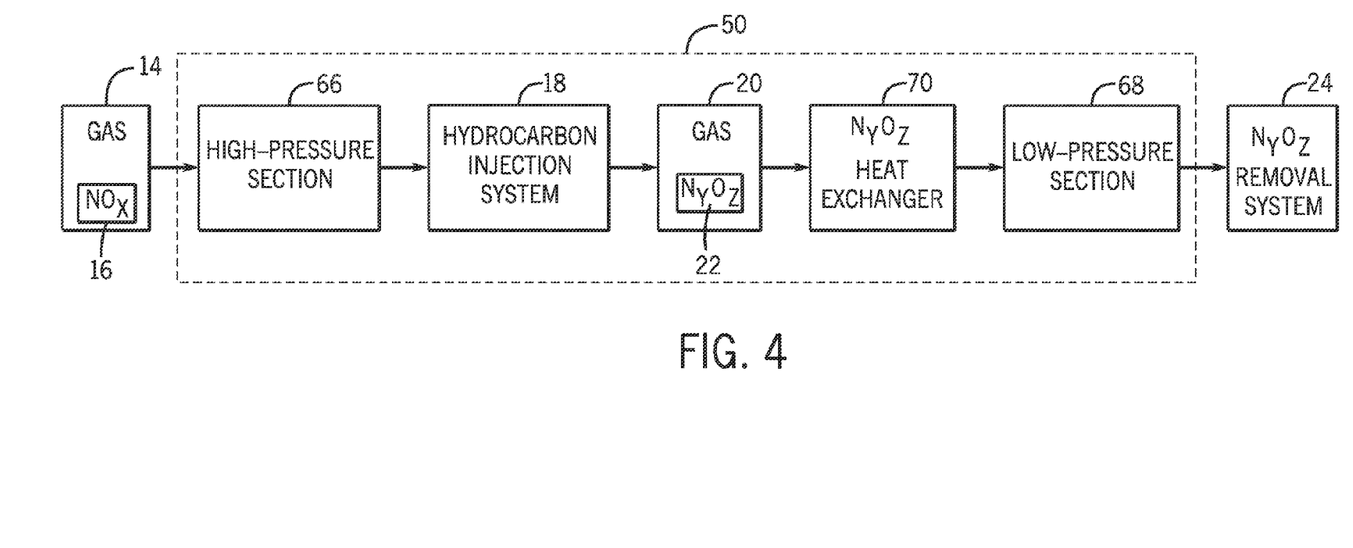
FIG. 4 is a block diagram of an embodiment of a heat recovery steam generator (HRSG) that includes a system for reducing $NO_x$ emissions.

FIG. 4 is a block diagram of an embodiment of the HRSG 50 that includes the hydrocarbon injection system 18. In certain embodiments, the HRSG 50 may include one or more sections that generate steam at different pressures. Each section may include a separate heat exchanger to transfer heat from the gas 14 to water to generate steam. For example, as shown in FIG. 4, the HRSG 50 may include a high-pressure section 66 that generates high-pressure steam and a low-pressure section 68 that generates low-pressure steam. In other embodiments, the HRSG 50 may include additional sections, such as an intermediate-pressure section. As the gas 14 flows through the high-pressure section 66, the temperature of the gas 14 may decrease as heat is transferred to generate the high-pressure steam. Next, the gas 14 may enter the hydrocarbon injection system 18 disposed between the high-pressure section 66 and the low-pressure section 68. In certain embodiments, the temperature of the gas 14 entering the hydrocarbon injection system 18 may be greater than approximately 350 degrees Celsius. Such high temperatures may be favorable for the oxidization of $NO_x$ 16 into $N_yO_z$ 22 for several reasons. For example, the residence time for the oxidation of $NO_x$ 16 into $N_yO_z$ 22 in the hydrocarbon injection system 18 may decrease as a function of temperature. Specifically, the residence time for the oxidation of $NO_x$ 16 may be lower at temperatures greater than approximately 350 degrees Celsius compared to residence times at temperatures less than approximately 350 degrees Celsius. In general, a shorter residence time may enable a reaction to occur over a shorter length of a reactor. Thus, the length of the hydrocarbon injection system 18 may be reduced when the temperature of the gas 14 is greater than approximately 350 degrees Celsius. A shorter hydrocarbon injection system 18 may take up less space in the HRSG 50, thereby reducing any additional cost or complexity associated with incorporating the hydrocarbon injection system 18 within the HRSG 50.

In certain embodiments, the gas 20 from the hydrocarbon injection system 18 may pass through an $N_yO_z$ heat exchanger 70, as shown in FIG. 4. The $N_yO_z$ heat exchanger 70 may be used to reduce the temperature of the gas 20 before flowing the gas 20 to the low-pressure section 68. For example, a cooling fluid, such as water, may flow through the $N_yO_z$ heat exchanger 70 to remove heat from the gas 20. In certain embodiments, the $N_yO_z$ heat exchanger 70 may reduce the temperature of the gas 20 to less than approximately 350 degrees Celsius, which may be favorable for the oxidization of $NO_x$ 16 into $N_yO_z$ 22 for several reasons. For example, certain metals, such as stainless steel, may catalyze the reduction of $N_yO_z$ 22 into $NO_x$ 16 at temperatures greater than approximately 350 degrees Celsius. At such temperatures, the reduction of $N_yO_z$ 22 may proceed until the concentration of $NO_x$ 16 exceeds that of $N_yO_z$ 22. In some embodiments, such metals may be found in the low-pressure section 68 or elsewhere in the HRSG 50. Thus, by reducing the temperature of the gas 20 to less than approximately 350 degrees Celsius before flowing the gas 20 through the low-pressure section 68, the reduction of $N_yO_z$ 22 into $NO_x$ 16 may be reduced or avoided. Thus, the $N_yO_z$ 22 may be removed in the $N_yO_z$ removal system 24 downstream of the HRSG 50. In certain embodiments, the surfaces of the $N_yO_z$ heat exchanger 70 exposed to the gas 20 may be coated with an inert coating, such as, but not limited to, silicon oxide, zirconium oxide, or alumina oxide, to help reduce the reduction of $N_yO_z$ 22 into $NO_x$ 16 within the $N_yO_z$ heat exchanger 70. In further embodiments, the $N_yO_z$ heat exchanger 70 may be omitted if the HRSG 50 is operated such that the temperature of the gas 20 from the hydrocarbon injection system 18 is maintained at a temperature less than approximately 350 degrees Celsius. In other embodiments, the $N_yO_z$ heat exchanger 70 may be omitted if the metal surfaces of the HRSG 50 located downstream of the hydrocarbon injection system 18 are coated with the inert coating or are made from a metal that does not significantly catalyze the reduction of $N_yO_z$ 22 into $NO_x$ 16. In yet other embodiments, the temperature of the gas 20 may be controlled at values other than at or below approximately 350 degrees Celsius. For example, the particular materials used in the construction of the HRSG 50 and/or the particular reaction kinetics of the $NO_x$ abatement system 10 may determine what temperature to operate below to avoid the reduction of $N_yO_z$ 22 into $NO_x$ 16.

Figure 5:
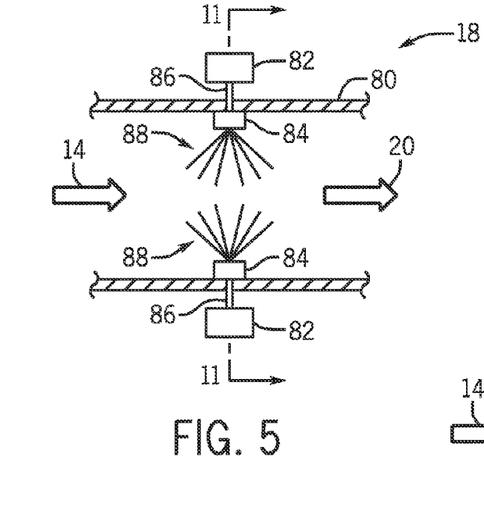
FIG. 5 is a cross-sectional view of an embodiment of a hydrocarbon injection system with two injectors.

FIG. 5 is a cross-sectional view of an embodiment of the hydrocarbon injection system 18. As shown in FIG. 5, the gas 14 enters the hydrocarbon injection system 18 and the treated gas 20 exits the hydrocarbon injection system 18, as indicated by arrows 14 and 20. The hydrocarbon injection system 18 may be disposed in a passage 80, which may be located upstream of the HRSG 50 or the burner 60, for example. In certain embodiments, the passage 80 may be an integral part of the HRSG 50, such as part of the entrance of the HRSG 50. A hydrocarbon tank 82 or fuel may be located near the passage 80 and used to store the hydrocarbon used in the hydrocarbon injection system 18. In certain embodiments, the hydrocarbon tank 82 may be located away from the passage 80, and piping or tubing may be used to convey the hydrocarbon to the hydrocarbon injection system 18. A hydrocarbon injector 84 or nozzle may be disposed in the passage 80 and a hydrocarbon passage 86 may couple the hydrocarbon tank 82 to the hydrocarbon injector 84. The hydrocarbon injector 84 may be configured to provide a hydrocarbon mist or spray 88 of the hydrocarbon within the passage 80. Reducing the size of the hydrocarbon droplets in the mist or spray 88 may help to improve the efficiency of the hydrocarbon injection system 18. Specifically, smaller droplets of the hydrocarbon spray 88 may increase the amount of the gas 18 exposed to the hydrocarbon. In certain embodiments, the hydrocarbon injection system 18 may include two hydrocarbon injectors 84 disposed opposite from one another, as shown in FIG. 5. Thus, the hydrocarbon injectors 84 may be positioned to expose most or all of the gas 14 flowing through the passage 80 to the hydrocarbon spray 88. In other embodiments, a plurality of hydrocarbon injectors 84 may be disposed throughout the passage 80 to help expose most or all of the gas 14 to the hydrocarbon spray 88.

Figure 6:
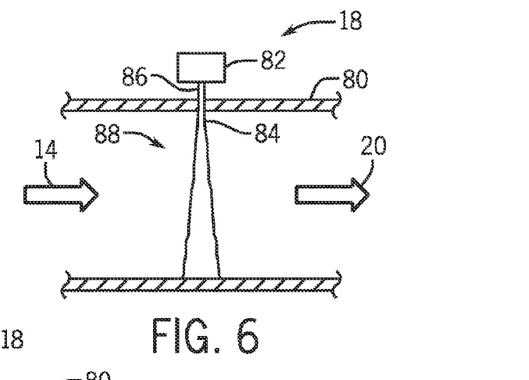
FIG. 6 is a cross-sectional view of an embodiment of a hydrocarbon injection system with a falling film injector.

FIG. 6 is a cross-sectional view of an embodiment of the hydrocarbon injection system 18 using a falling film of hydrocarbon. Elements in FIG. 6 in common with those shown in FIG. 5 are labeled with the same reference numerals. In the illustrated embodiment, the hydrocarbon injector 84 provides a falling film 88 of hydrocarbon. In other words, the hydrocarbon injector 84 may provide a continuous flowing wall or stream of hydrocarbon through which the gas 14 passes. Thus, the hydrocarbon injector 84 may be located near the top of the passage 80. Use of the hydrocarbon falling film 88 shown in FIG. 6 may result in a higher consumption or usage rate of the hydrocarbon compared to the hydrocarbon spray 88 used in the embodiment shown in FIG. 5. However, the hydrocarbon falling film 88 may increase the amount of the gas 14 that contacts the hydrocarbon, thereby increasing the efficiency of the hydrocarbon injection system 18.

Figure 7:
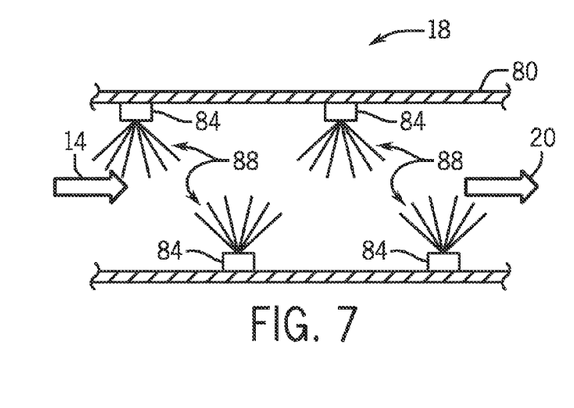
FIG. 7 is a cross-sectional view of an embodiment of a hydrocarbon injection system with a plurality of injectors in a staggered arrangement.

FIG. 7 is a cross-sectional view of an embodiment of the hydrocarbon injection system 18 with a plurality of hydrocarbon injectors 84. Elements in FIG. 7 in common with those shown in FIG. 5 are labeled with the same reference numerals. Specifically, the hydrocarbon injectors 84 may be disposed in a staggered or alternating pattern along the passage 80. For example, a hydrocarbon injector 84 disposed the top of the passage 80 may be followed by a hydrocarbon injector 84 disposed near the bottom of the passage 80. Such a pattern may repeat along the length of the passage 80. By using a plurality of hydrocarbon injectors 84, more of the gas 14 may be exposed to the hydrocarbon spray 88, thereby increasing the conversion of the $NO_x$ 16 into $N_yO_z$ 22 by the hydrocarbon injection system 18.

Figure 8:
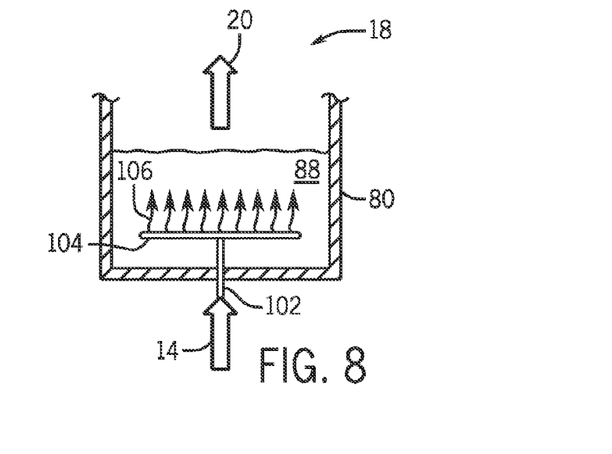
FIG. 8 is a cross-sectional view of an embodiment of a hydrocarbon injection system with a sparger.

FIG. 8 is a cross-sectional view of an embodiment of the hydrocarbon injection system 18 configured as a sparger. In the illustrated embodiment, the gas 14 may enter near the bottom of the passage 80. Specifically, the passage 80 may contain a hydrocarbon reservoir 88. A gas injection tube 102 may be used to transport the gas 14 into the hydrocarbon reservoir 88. In certain embodiments, the hydrocarbon injection tube 102 may be a pipe, duct, or similar conveyance for transporting the gas 14. The gas injection tube 102 may be coupled to a gas dispersion tube 104, which may be configured with a plurality of holes to enable the gas 14 to enter the hydrocarbon reservoir 88. Specifically, a plurality of gas flows 106 may emerge from the gas dispersion tube 104 and pass through the hydrocarbon reservoir 88. Thus, the gas 14 may be sparged or bubbled through the hydrocarbon reservoir 88, providing complete contact between the gas 14 and the hydrocarbon, thereby increasing the efficiency of the conversion of $NO_x$ 16 into $N_yO_z$ 22.

Figure 9:
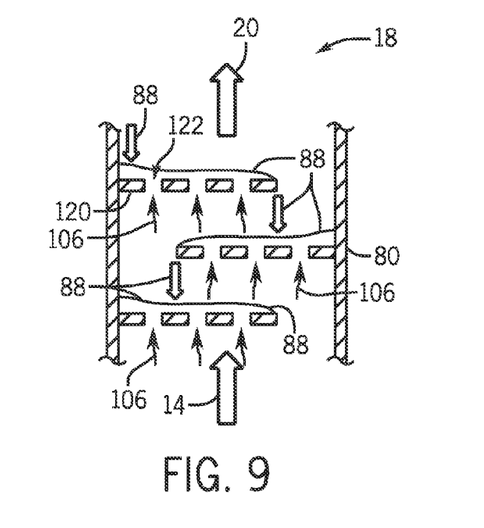
FIG. 9 is a cross-sectional view of an embodiment of a hydrocarbon injection system with a trayed column.

FIG. 9 is a cross-sectional view of an embodiment of the hydrocarbon injection system 18. As shown in FIG. 9, the hydrocarbon injection system 18 may be configured in a manner similar to a trayed distillation column. Specifically, the gas 14 may enter from the bottom of the passage 80 and the hydrocarbon stream 88 may enter from the top of the passage 80. Thus, the gas 14 and the hydrocarbon stream 88 may flow in a counter current manner through the hydrocarbon injection system 18. One or more trays 120 may be disposed along the passage 80. Each of the trays 120 may include one or more openings 122 through which the plurality of gas flows 106 passes. The hydrocarbon stream 88 may flow along the trays 120 and then flow downward to the next tray 120 until exiting the bottom of the passage 80. Such a configuration of the hydrocarbon injection system 18 may help the gas 14 to come in complete contact with the hydrocarbon stream 88, thereby increasing the efficiency of the conversion of the $NO_x$ 16 in the gas 14 into $N_yO_z$ 22 in the treated gas 20.

Figure 10:
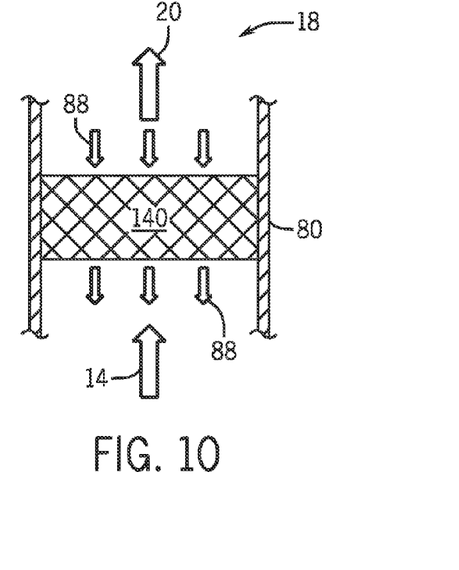
FIG. 10 is a cross-sectional view of an embodiment of a hydrocarbon injection system with a packed column.

FIG. 10 is a cross-sectional view of an embodiment of the hydrocarbon injection system 18. Specifically, the configuration of the hydrocarbon injection system 18 shown in FIG. 10 is similar to that of a packed distillation column. Thus, the gas 14 may enter the bottom of the passage 80 and move in an upward direction and the hydrocarbon stream 88 may enter the top of the passage 80 and move in a downward direction. Packing 140 may be disposed in the passage 80. The packing 140 may include thin corrugated metal plates or gauzes arranged in such a way that fluids flow through complicated paths through the packing 140, thereby creating a large surface area for contact between difference phases. Thus, the large surface area of the packing 140 may help increase the efficiency of the conversion of the $NO_x$ in the gas 14 into $N_yO_z$ 22 in the treated gas 20.

Figure 11:
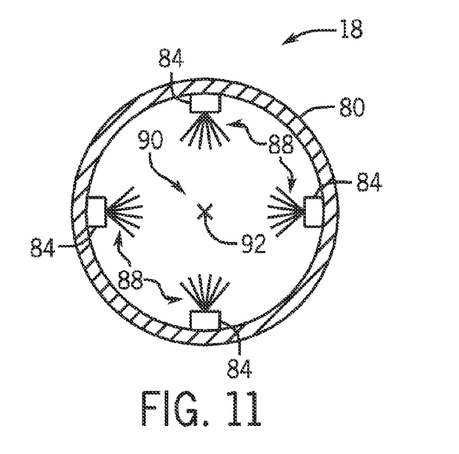
FIG. 11 is a radial cross-sectional view of an embodiment of a hydrocarbon injection system with a plurality of injectors directed radially toward a central region.

FIG. 11 is a radial cross-section of the hydrocarbon injection system 18 along the line labeled 11-11 in FIG. 5. Elements in FIG. 11 in common with those shown in FIG. 5 are labeled with the same reference numerals. As shown in FIG. 11, several hydrocarbon injectors 84 may be disposed in the passage 80. For example, one hydrocarbon injector 84 may be disposed near the top of the passage 80 and another hydrocarbon injector disposed near the bottom of the passage 80. In certain embodiments, additional hydrocarbon injectors 84 may be disposed between the top and bottom hydrocarbon injectors 84. As shown in FIG. 11, the hydrocarbon injectors 84 are arranged in a converging relationship, i.e., the hydrocarbon injectors 84 point radially toward a central region 90 or a longitudinal axis 92 of the passage 80. Thus, the plurality of hydrocarbon injectors 84 may provide an even, complete pattern of hydrocarbon sprays 88 for the gas 14 flowing through the passage 80 to be exposed to. In other embodiments, fewer or more hydrocarbon injectors 84 may be disposed in the passage 80.

Figure 12:
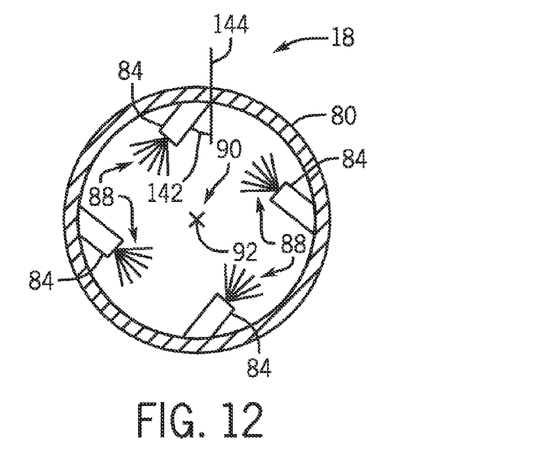
FIG. 12 is a radial cross-sectional view of an embodiment of a hydrocarbon injection system with a plurality of injectors arranged to form a swirling flow about a central region.

FIG. 12 is a radial cross-section of the hydrocarbon injection system 18 according to an embodiment. As shown in FIG. 12, each of the hydrocarbon injectors 84 may be configured at an angle 142 from a line 144 normal to the passage 80. Thus, the hydrocarbon injectors 84 extend radially toward the central region 90, but do not intersect the longitudinal axis 92 of the passage 80. Thus, the hydrocarbon sprays 88 may be oriented away from the central region 90 of the passage 80. Accordingly, the configuration of the hydrocarbon injectors 84 in the illustrated embodiment may produce a swirling pattern or flow of hydrocarbon sprays 88. In certain embodiments, such a swirling flow of hydrocarbon sprays 88 may help increase the amount of gas 14 that makes contact with the hydrocarbon sprays 88, thereby increasing the efficiency of the hydrocarbon injection system 18.

Figure 13:
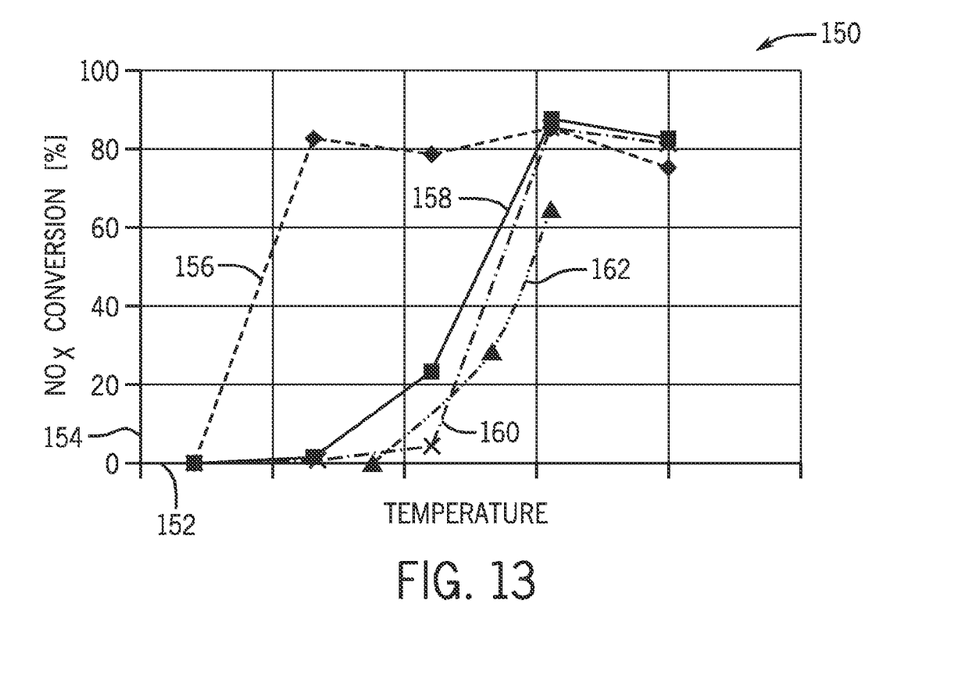
FIG. 13 is a graph of nitrogen oxide (NO) conversion as a function of temperature for different hydrocarbons in accordance with an embodiment of the hydrocarbon injection system.

FIG. 13 is a graph 150 of the performance of different hydrocarbons that may be used in the hydrocarbon injection system 18. An x-axis 152 represents temperature and a y-axis 154 represents conversion of $NO_x$ 16 to $N_yO_z$ 22. A first curve 156 represents the performance of an ultra low sulfur diesel (ULSD), which may be defined as a diesel fuel with substantially lowered sulfur content. Diesel fuel may be produced from the fractional distillation of crude oil between approximately 200 to 350 degrees Celsius, resulting in a mixture of carbon chains that may contain between 8 to 21 carbon atoms per molecule. Thus, the ULSD used to produce first curve 156 may contain a wide range of carbon molecules. As shown in FIG. 13, the first curve 156 may have a $NO_x$ conversion greater than approximately 80 percent over a wide temperature range. Such performance by the ULSD may be attributable to the wide range of carbon molecules found in the ULSD. Next, a second curve 158 representing the performance of E85 is shown in FIG. 13. E85 is an abbreviation for an ethanol fuel blend of up to approximately 85 percent denatured ethanol fuel and the balance gasoline by volume. Thus, E85 may be a mixture of primarily two components, namely ethanol and gasoline. As shown in FIG. 13, the second curve 158 may have a $NO_x$ conversion greater than approximately 80 percent over a smaller temperature range compared to that of the ULSD. Such performance by the E85 may be attributable to the smaller range of the carbon molecules found in the E85.

Next, a third curve 160 of FIG. 13 shows the performance of propene, which may also be referred to as propylene. As shown in FIG. 13, the $NO_x$ conversion performance of propene may be greater than approximately 80 percent over a smaller temperature range compared to that of the ULSD and the E85. Such performance may be attributable to the single carbon molecule found in propene. A fourth curve 162 of FIG. 13 illustrates the $NO_x$ conversion performance for propane. As shown, the NO conversion performance for propane 162 may be less than that of the ULSD, E85, and propene. Thus, it may be desirable to use mixtures of hydrocarbons with a range of carbon molecules as the hydrocarbon in the hydrocarbon injection system 18. Use of such mixtures of hydrocarbons in the hydrocarbon injection system 18 may provide desirable $NO_x$ conversion over a wider range of temperatures. For example, the temperature range corresponding to $NO_x$ conversion greater than approximately 80 percent for the first curve 156 (ULSD) may correspond to an expected temperature range of the gas 14 generated by the gas turbine engine 12. For example, the temperature of the gas 14 generated by the gas turbine engine 12 may be between approximately 260 to 700, 370 to 650, or 480 to 590 degrees Celsius.

Figure 14:
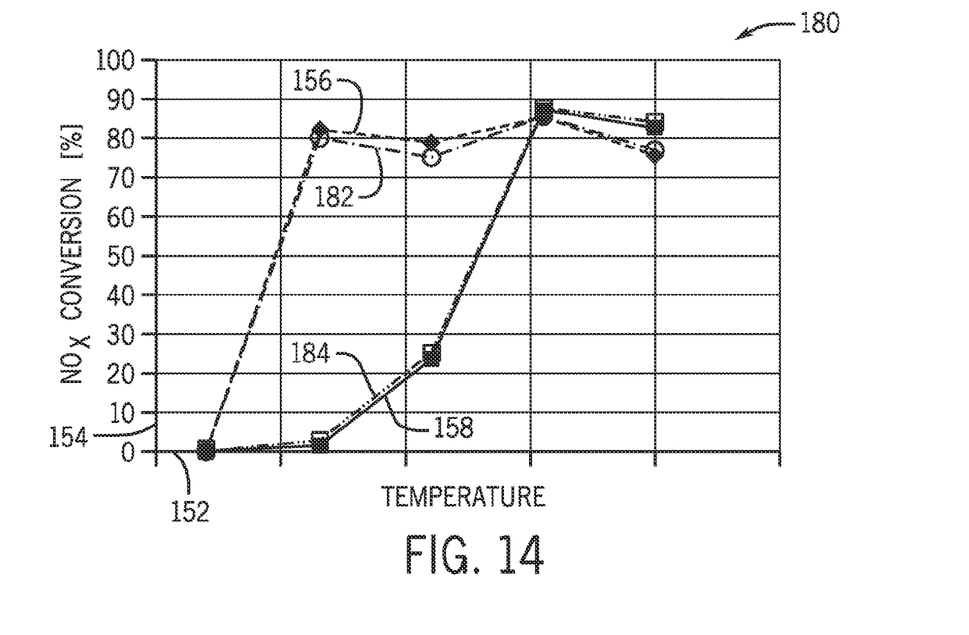
FIG. 14 is a graph of NO conversion as a function of temperature and sulfur dioxide content for different hydrocarbons in accordance with an embodiment of the hydrocarbon injection system.

FIG. 14 is a graph 180 of the performance of two hydrocarbons that may be used in the hydrocarbon injection system 18. Specifically, FIG. 14 illustrates the effect of $SO_2$ on the $NO_x$ conversion performance of the hydrocarbons used in the hydrocarbon injection system 18. As shown in FIG. 14, the $NO_x$ conversion performance for the ULSD and the E85 is repeated from FIG. 13, as indicated by first and second curves 156 and 158. In addition, FIG. 14 includes a fifth curve 182 that shows the $NO_x$ conversion performance for ULSD with gas 14 that includes $SO_2$. For example, the gas 14 may include at least approximately 50 ppm of $SO_2$. In prior systems that use catalysts, the presence of $SO_2$ may significantly reduce the $NO_x$ conversion. In other words, certain catalysts may be poisoned or deactivated by $SO_2$. However, as shown in FIG. 14, the performance of the ULSD with gas 14 containing $SO_2$ is approximately the same as the performance of the ULSD with gas 14 free of $SO_2$, as shown by first curve 156. Similarly, FIG. 14 includes a sixth curve 184 that shows the $NO_x$ conversion performance for E85 with gas 14 that includes $SO_2$. For example, the gas 14 may include at least approximately 50 ppm of $SO_2$. As shown in FIG. 14, the performance of the E85 with gas 14 containing $SO_2$ is approximately the same as the performance of the E85 with gas 14 free of $SO_2$, as shown by second curve 158. Indeed, even higher concentrations of $SO_2$ in the gas 14 may have little to no negative effect on the $NO_x$ conversion performance. Thus, use of the hydrocarbon injection system 18 may be desirable with gases 14 that contain $SO_2$.

As described above, certain embodiments of the hydrocarbon injection system 18 may be used to inject a hydrocarbon into gas 14 that includes $NO_x$ 16. The injected hydrocarbon may oxidize the $NO_x$ 16 into $N_yO_z$ 22, which may be more soluble in water than $NO_x$ 16. Thus, the $N_yO_z$ removal system 24, which may be a water-based system, may be used to remove the $N_yO_z$ 22 to produce an exhaust gas 26 with concentrations of $NO_x$ 16 and/or $N_yO_z$ 22 low enough to meet applicable environmental regulations. Byproducts of the hydrocarbon injection system 18 may include carbon monoxide and excess hydrocarbon, which may be combusted in the burner 60 or oxidized in the oxidation catalyst 62. In fact, the same hydrocarbon used in the burner 60 may also be used in the hydrocarbon injection system 18, thereby simplifying the $NO_x$ abatement system 10. In addition, byproducts from the hydrocarbon injection system 18 may not be expected to accumulate on surfaces of the HRSG 50 and thus, may have little to no effect on the performance of the HRSG 50. Further, the hydrocarbon injection system 18 may provide high conversion rates of $NO_x$ 16 to $N_yO_z$ 22 over a wide temperature range that corresponds to the expected operating range of the gas turbine engine 12. In addition, the hydrocarbon injection system 18 may not suffer from decreased $NO_x$ abatement when the gas 14 includes $SO_2$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine configured to produce an exhaust gas stream comprising nitrogen oxides ($NO_x$);
   a hydrocarbon injector disposed downstream of the gas turbine and configured to inject a hydrocarbon into the exhaust gas stream, wherein the hydrocarbon is configured to oxidize molecules of the $NO_x$ in the exhaust gas stream to produce a higher order compound of nitrogen and oxygen ($N_yO_z$); and
   a removal device disposed downstream of the hydrocarbon injector, wherein the removal device is configured to remove the $N_yO_z$ from the exhaust gas stream via absorption or reaction, wherein the system comprises at least one of:
   a heat recovery steam generator (HRSG), wherein the hydrocarbon injector is disposed upstream from or within the HRSG; or
   a burner downstream of the hydrocarbon injector, wherein the burner is configured to heat the exhaust gas stream and to combust byproducts generated by the oxidation of the $NO_x$ by the hydrocarbon injector; or an oxidation catalyst disposed downstream of the hydrocarbon injector, wherein the oxidation catalyst is configured to oxidize byproducts generated by the oxidation of the $NO_x$ by the hydrocarbon injector; or any combination thereof.

2. The system of claim 1, wherein the removal device comprises a water injecting device and a water collector.

3. The system of claim 1, wherein the removal device is configured to remove at least approximately 40 percent of the $N_yO_z$ from the exhaust gas stream.

4. The system of claim 1, comprising the heat recovery steam generator (HRSG) disposed between the hydrocarbon injector and the removal device, wherein the HRSG is configured to remove heat from the exhaust gas stream to help generate steam.

5. The system of claim 1, comprising the heat recovery steam generator (HRSG) disposed between the gas turbine and the removal device, wherein the HRSG is configured to remove heat from the exhaust gas stream to help generate steam, and the hydrocarbon injector is disposed within the HRSG.

6. The system of claim 5, comprising an $N_yO_z$ heat exchanger disposed downstream of the hydrocarbon injector and within the HRSG, wherein the $N_yO_z$ heat exchanger is configured to remove heat from the exhaust gas stream.

7. The system of claim 6, wherein surfaces of the $N_yO_z$ heat exchanger configured to be exposed to the exhaust gas stream are coated with an inert coating.

8. The system of claim 1, comprising the burner downstream of the hydrocarbon injector, wherein the burner is configured to heat the exhaust gas stream and to combust byproducts generated by the oxidation of the $NO_x$ by the hydrocarbon injector.

9. The system of claim 1, comprising the oxidation catalyst disposed downstream of the hydrocarbon injector, wherein the oxidation catalyst is configured to oxidize byproducts generated by the oxidation of the $NO_x$ by the hydrocarbon injector.

10. The system of claim 1, wherein the hydrocarbon injector is configured to oxidize at least approximately 40 percent of the $NO_x$ in the exhaust gas stream to produce the $N_yO_z$.

11. The system of claim 1, wherein the hydrocarbon injector is configured to increase a ratio of the $N_yO_z$ in the exhaust gas stream to the $NO_x$ in the exhaust gas stream to greater than approximately 2:1.

12. The system of claim 1, comprising a storage tank to supply the hydrocarbon to the hydrocarbon injector, wherein the hydrocarbon comprises at least one of diesel, ultra-low-sulfur diesel, gasoline, ethanol, propene, or propane, or a combination thereof.

13. The system of claim 1, wherein the hydrocarbon injector comprises a liquid hydrocarbon injector configured to inject a liquid hydrocarbon into the exhaust gas stream.

14. The system of claim 1, wherein the gas turbine comprises a combustor configured to combust a sulfur containing fuel to generate the exhaust gas stream.

15. The system of claim 1, comprising:
the heat recovery steam generator (HRSG) downstream from the gas turbine, wherein the HRSG is configured to generate stream using heat from the exhaust gas stream; and
a steam turbine driven by the steam from the HRSG.

16. A system, comprising:
a hydrocarbon supply system configured to supply a hydrocarbon into an exhaust gas stream downstream from a gas turbine and upstream from or within a heat recovery steam generator (HRSG), wherein the hydrocarbon is configured to oxidize nitrogen oxides ($NO_x$) in the exhaust gas stream to produce a higher order compound of nitrogen and oxygen ($N_yO_z$);
a removal device disposed downstream of the hydrocarbon supply system, wherein the removal device is configured to remove the $N_yO_z$ from the exhaust gas stream via absorption or reaction; and
a controller configured to adjust the hydrocarbon injector and/or the removal device in response to sensor feedback to reduce a $NO_x$ level below a threshold $NO_x$ level in the exhaust gas stream downstream of the removal device.

17. The system of claim 16, comprising the gas turbine configured to produce the exhaust gas stream, wherein the controller is communicatively coupled to the gas turbine.

18. The system of claim 16, wherein the removal device comprises a water-based removal device configured to supply water to help remove the $N_yO_z$ from the exhaust gas stream.

19. The system of claim 16, wherein the hydrocarbon supply system includes a hydrocarbon storage tank, wherein the hydrocarbon comprises at least one of heavy fuel oil, Number 6 fuel oil, crude oil, kerosene, diesel, ultra-low-sulfur diesel, gasoline, ethanol, propylene, or propane, or a combination thereof 20. The system of claim 16, wherein the hydrocarbon supply system comprises a liquid hydrocarbon supply system having at least one of an injector, a sprayer, a falling film, a sparger, a nozzle, a trayed column, or a packed column, or a combination thereof.

21. A method, comprising:
oxidizing nitrogen oxides ($NO_x$) in an exhaust gas stream downstream from a gas turbine by contacting the exhaust gas stream with a hydrocarbon to produce a higher order compound of nitrogen and oxygen ($N_yO_z$); and
removing the $N_yO_z$ from the exhaust gas stream via absorption or reaction downstream from the oxidizing, wherein the method comprises at least one of:
flowing the hydrocarbon into the exhaust gas stream upstream from or within a heat recovery steam generator (HRSG); or
heating the exhaust gas stream to combust byproducts generated by the oxidation of the $NO_x$ by the hydrocarbon; or
contacting the exhaust gas stream with an oxidation catalyst to oxidize the byproducts; or
any combination thereof.

22. The method of claim 21, wherein contacting the exhaust gas stream with the hydrocarbon comprises injecting the hydrocarbon into the exhaust gas stream using a liquid hydrocarbon injector.

23. The method of claim 21, comprising heating the exhaust gas stream to combust byproducts generated by the oxidation of the $NO_x$ by the hydrocarbon, or contacting the exhaust gas stream with the oxidation catalyst to oxidize the byproducts.

24. The method of claim 21, comprising removing the $N_yO_z$ from the exhaust gas stream using water in a water-based removal system.

25. The method of claim 21, comprising flowing the hydrocarbon into the exhaust gas stream upstream from or within the heat recovery steam generator (HRSG).

* * * * *